US011280253B2

(12) United States Patent
Morris

(10) Patent No.: US 11,280,253 B2

(45) Date of Patent: Mar. 22, 2022

(54) PRIME MOVER AND LUBE OIL COOLING ASSEMBLY FOR FRACTURING PUMP TRANSPORT

(71) Applicant: Typhon Technology Solutions, LLC, The Woodlands, TX (US)

(72) Inventor: Jeffrey G. Morris, The Woodlands, TX (US)

(73) Assignee: TYPHON TECHNOLOGY SOLUTIONS, LLC, The Woodlands, TX (US)

(*) Notice: Subject to any disclaimer, the term of this patent is extended or adjusted under 35 U.S.C. 154(b) by 128 days.

(21) Appl. No.: 16/717,732

(22) Filed: Dec. 17, 2019

(65) Prior Publication Data

US 2020/0208565 A1 Jul. 2, 2020

Related U.S. Application Data

(60) Provisional application No. 62/786,174, filed on Dec. 28, 2018.

(51) Int. Cl.

*E21B 43/16* (2006.01)
*F01P 11/08* (2006.01)
(Continued)

(52) U.S. Cl.

CPC ............ *F01P 11/08* (2013.01); *E21B 36/001* (2013.01); *E21B 43/16* (2013.01); *F01P 2003/006* (2013.01)

(58) Field of Classification Search

CPC ......... E21B 36/001; E21B 43/16; E21B 43/26
See application file for complete search history.

(56) References Cited

U.S. PATENT DOCUMENTS

| | | | |
|---|---|---|---|
| 9,121,257 | B2 | 9/2015 | Coli et al. |
| 9,140,110 | B2 | 9/2015 | Coli et al. |

(Continued)

FOREIGN PATENT DOCUMENTS

| | | | |
|---|---|---|---|
| AR | 092923 | A1 | 5/2015 |
| AR | 104823 | A2 | 8/2017 |

(Continued)

OTHER PUBLICATIONS

PCT/US2019/66907 International Search Report and the Written Opinion of the International Authority dated Mar. 25, 2020, 12 pages.

(Continued)

*Primary Examiner* — Taras P Bemko
*Assistant Examiner* — Ronald R Runyan
(74) *Attorney, Agent, or Firm* — Keith R. Derrington; Bracewell LLP

(57) ABSTRACT

A system and a method for cooling a prime mover and lube oil, comprising: a prime mover configured to drive a pump with a motor shaft; a prime mover cooling assembly that encases the prime mover, wherein the prime mover cooling assembly comprises: an air intake and an exhaust ventilator mounted above the prime mover; and a lube oil cooling assembly mounted above the prime mover, wherein the lube oil cooling assembly cools lube oil circulating within the pump and is mounted above the prime mover such that the lube oil cooling assembly does not hang off one or more sides of the prime mover and prime mover cooling assembly.

20 Claims, 6 Drawing Sheets

200 205 300 350 318 304 302 210 202 220A 224A 226A 226B 224B 220B 230 232 208 204 228 330 330 228 206

(51) Int. Cl.

| | |
|---|---|
| ***E21B 36/00*** | (2006.01) |
| *F01P 3/00* | (2006.01) |

(56) References Cited

U.S. PATENT DOCUMENTS

| | | | | |
|---|---|---|---|---|
| 9,475,020 | B2 | 10/2016 | Coli et al. | |
| 9,475,021 | B2 | 10/2016 | Coli et al. | |
| 9,534,473 | B2 | 1/2017 | Morris et al. | |
| 10,107,084 | B2 | 10/2018 | Coli et al. | |
| 10,107,085 | B2 | 10/2018 | Coli et al. | |
| 10,221,668 | B2 | 3/2019 | Coli et al. | |
| 10,227,855 | B2 | 3/2019 | Coli et al. | |
| 10,502,042 | B2 | 12/2019 | Coli et al. | |
| 10,648,312 | B2 | 5/2020 | Coli et al. | |
| 10,689,961 | B2 | 6/2020 | Coli et al. | |
| 10,718,194 | B2 | 7/2020 | Coli et al. | |
| 10,724,353 | B2 | 7/2020 | Coli et al. | |
| 10,774,630 | B2 | 9/2020 | Coli et al. | |
| 10,830,029 | B2 * | 11/2020 | Bishop | F04B 17/05 |
| 10,837,270 | B2 | 11/2020 | Coli et al. | |
| 10,851,634 | B2 | 12/2020 | Coli et al. | |
| 10,876,386 | B2 | 12/2020 | Coli et al. | |
| 10,895,138 | B2 | 1/2021 | Coli et al. | |
| 2014/0096974 | A1 | 4/2014 | Coli et al. | |
| 2014/0251623 | A1 | 9/2014 | Lestz et al. | |
| 2015/0068724 | A1 | 3/2015 | Coli et al. | |
| 2015/0252661 | A1 | 9/2015 | Glass | |
| 2015/0300145 | A1 | 10/2015 | Coli et al. | |
| 2015/0314255 | A1 | 11/2015 | Coli et al. | |
| 2016/0177675 | A1 * | 6/2016 | Morris | F01D 15/10 166/308.1 |
| 2016/0208593 | A1 | 7/2016 | Coli et al. | |
| 2016/0208594 | A1 | 7/2016 | Coli et al. | |
| 2016/0258267 | A1 | 9/2016 | Payne et al. | |
| 2016/0326855 | A1 | 11/2016 | Coli et al. | |
| 2016/0369609 | A1 | 12/2016 | Morris et al. | |
| 2017/0036178 | A1 | 2/2017 | Coli | |
| 2017/0037718 | A1 | 2/2017 | Coli et al. | |
| 2017/0104389 | A1 | 4/2017 | Morris et al. | |
| 2017/0259227 | A1 | 9/2017 | Morris et al. | |
| 2018/0363434 | A1 | 12/2018 | Coli et al. | |
| 2018/0363435 | A1 | 12/2018 | Coli et al. | |
| 2018/0363436 | A1 | 12/2018 | Coli et al. | |
| 2018/0363437 | A1 | 12/2018 | Coli et al. | |
| 2018/0363438 | A1 | 12/2018 | Coli et al. | |
| 2019/0055827 | A1 | 2/2019 | Coli et al. | |
| 2019/0112908 | A1 | 4/2019 | Coli et al. | |
| 2019/0271218 | A1 | 9/2019 | Coli et al. | |
| 2019/0277125 | A1 | 9/2019 | Coli et al. | |
| 2019/0277126 | A1 | 9/2019 | Coli et al. | |
| 2019/0277127 | A1 | 9/2019 | Coli et al. | |
| 2019/0277128 | A1 | 9/2019 | Coli et al. | |
| 2020/0318467 | A1 | 10/2020 | Coli et al. | |
| 2020/0347710 | A1 | 11/2020 | Coli et al. | |
| 2020/0347711 | A1 | 11/2020 | Coli et al. | |

FOREIGN PATENT DOCUMENTS

| | | | |
|---|---|---|---|
| AR | 104824 | A2 | 8/2017 |
| AR | 104826 | A2 | 8/2017 |
| AR | 087298 | A1 | 12/2017 |
| CA | 2773843 | A | 10/2012 |
| CA | 2835904 | A1 | 10/2012 |
| CA | 2845347 | A1 | 10/2012 |
| CA | 2900387 | A1 | 10/2012 |
| CA | 2955706 | A1 | 10/2012 |
| CN | 207194878 | U | 4/2018 |
| EP | 3444430 | A1 | 2/2019 |
| EP | 3444431 | A1 | 2/2019 |
| EP | 3444432 | A1 | 2/2019 |
| EP | 3447239 | A1 | 2/2019 |
| EP | 3453827 | A2 | 3/2019 |
| EP | 3456915 | A1 | 3/2019 |
| MX | 358054 | B | 8/2018 |
| MX | 362628 | B | 1/2019 |
| MX | 365888 | B | 6/2019 |
| MX | 365889 | B | 6/2019 |
| MX | 366049 | B | 6/2019 |
| WO | 2012137068 | A2 | 10/2012 |
| WO | 2014053056 | A1 | 4/2014 |
| WO | 2018204293 | A1 | 11/2018 |

OTHER PUBLICATIONS

204US00 English translation of Office Action issued in the prosecution of application AR087298 B1 dated Dec. 29, 2017, 5 pages.

MX362628 Espacenet English Abstract, Publication Date of Jan. 29, 2019, 1 page.

MX365888 Espacenet English abstract, Publication date of Jun. 19, 2019, 1 page.

MX365889 Espacenet English Abstract, Publication Date of Jun. 19, 2019, 1 page.

MX366049B Espacenet English Abstract, Publication Date of Jun. 26, 2019, 1 page.

* cited by examiner

PRIME MOVER AND LUBE OIL COOLING ASSEMBLY FOR FRACTURING PUMP TRANSPORT

CROSS-REFERENCE TO RELATED APPLICATION

This application claims the benefit of U.S. Prov. Appl. No. 62/786,174 filed 28 Dec. 2018, which is incorporated herein by reference in its entirety.

BACKGROUND

Hydraulic fracturing has been commonly used by the oil and gas industry to stimulate production of hydrocarbon producing wells, such as oil and/or gas wells. Hydraulic fracturing, sometimes called "fracing" or "fracking" is the process of injecting fracturing fluid into a wellbore to fracture the subsurface geological formations and release hydrocarbons. The fracturing fluid is pumped into a wellbore at a pressure sufficient to cause fissures within the underground geological formations. Once inside the wellbore, the fracturing fluid fractures the underground formation. The fracturing fluid may include water, various chemical additives, and proppants that promote the extraction of the hydrocarbon reserves, such as oil and/or gas. Proppants, such as fracturing sand, prevent fissures and fractures in the underground formation from closing; thereby, allowing the formation to remain open so that hydrocarbons flow through the hydrocarbon wells.

Implementing fracturing operations at well sites requires extensive investment in equipment, labor, and fuel. A typical fracturing operation uses fracturing equipment, personnel to operate and maintain the fracturing equipment, large amounts of fuel to power the fracturing operations, and relatively large volumes of fracturing fluids. As such, planning for fracturing operations is complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing the environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein, and it is not intended to identify key or critical elements of the invention or to delineate the scope of the invention. Its sole purpose is to present concepts in a simplified form as a prelude to the more detailed description that is discussed later.

In one embodiment, a fracturing transport comprising: a prime mover configured to drive a pump with a motor shaft; a prime mover cooling assembly that encases the prime mover, wherein the prime mover cooling assembly comprises: an air intake and an exhaust ventilator mounted above the prime mover; and a lube oil cooling assembly mounted above the prime mover, wherein the lube oil cooling assembly cools lube oil circulating within the pump and is mounted above the prime mover such that the lube oil cooling assembly does not extend beyond the dimension of the prime mover.

In another embodiment, a fracturing pump transport comprising: a pump; an electric motor coupled to the pump; and a cooling assembly that encases the electric motor, wherein the cooling assembly is configured to: draw in air from one or more air intakes with one or more blowers positioned on top of the electric motor, ventilate air heated from cooling the electric motor at a top side of the cooling assembly with one or more exhaust ventilators, draw in air with one or more lube oil heat exchangers positioned on top of the electric motor; and ventilate, at the top side of the cooling assembly, air heated from cooling lube oil that circulates through the pump.

In yet another embodiment, a method comprising: drawing in air from one or more air intakes with one or more blowers positioned on top of an electric motor; cooling the electric motor with the air drawn in from the air intakes; ventilating air heated from cooling the electric motor at a top side of a cooling assembly with one or more exhaust ventilators; drawing in air with a lube oil heat exchanger positioned on top of the electric motor; cooling lube oil circulating through a pump with the air drawn in from the lube oil heat exchangers, wherein the pump is driven by the electric motor; and ventilating, at the top side of the cooling assembly, air heated from cooling lube oil that circulates through the pump.

In yet another embodiment, each of the above described embodiments and variations thereof, may be implemented as a method, apparatus, and/or system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
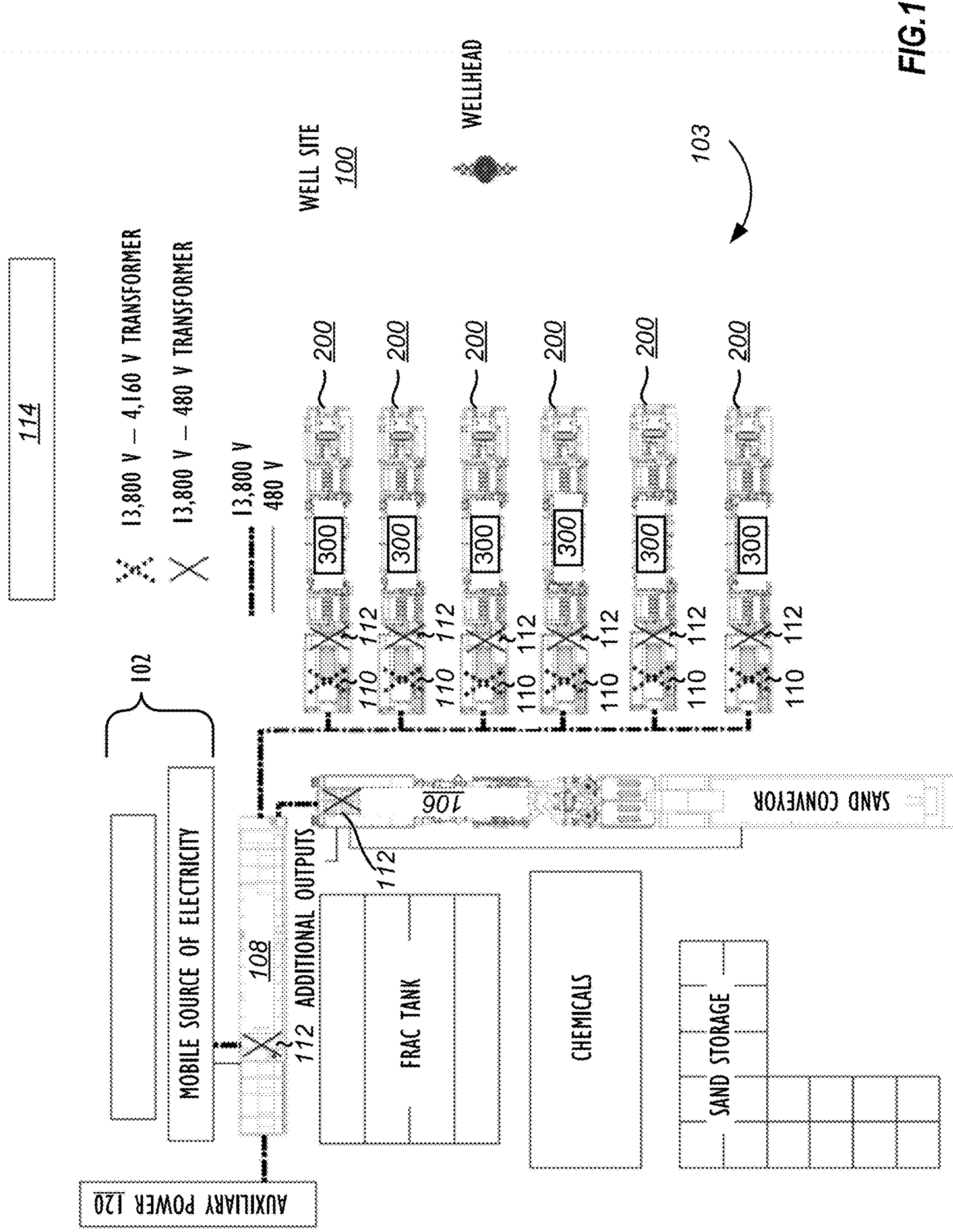
FIG. 1 is a diagram of an embodiment of a well site, where various embodiments may operate within.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

As used herein, the term "transport" refers to any transportation assembly, including, but not limited to, a trailer, truck, skid, rail car, and/or barge used to transport structures and/or other types of articles, such as fracturing equipment and fracturing sand. A transport can be independently movable from another transport. For example, a first transport can be mounted or connected to a motorized vehicle that independently moves the first transport while an unconnected second transport remains stationary.

As used herein, the term "trailer" refers to a transportation assembly used to transport structures and/or other types of articles (such as fracturing equipment and fracturing sand) that can be attached and/or detached from a transportation vehicle used to pull or tow the trailer. As an example, the transportation vehicle independently moves and tows a first trailer while an unconnected second trailer remains stationary. In one or more embodiments, the trailer includes mounts and manifold systems to connect the trailer to other fracturing equipment within a fracturing system or fleet. The term "laydown trailer" refers to a specific embodiment of a trailer that includes two sections with different vertical heights. One of the sections or the upper section is positioned at or above the trailer axles and another section or the lower section is positioned at or below the trailer axles. In one embodiment, the main trailer beams of the laydown trailer may be resting on the ground when in operational mode and/or when uncoupled from a transportation vehicle, such as a tractor.

As used herein, the term "low voltage" refers to a voltage range from about 50 volts (V) to 1,000 V for alternating current (AC) electric power. The term "medium voltage" refers to a voltage range from about 1,000 V to about 35 kilovolts (kV) for AC electric power, and the term "high voltage" refers to a voltage range greater than 35 kV for AC electric power. Although the terms "low voltage," "medium voltage," and "high voltage" generally refer to voltage ranges in AC electric power, the disclosure is not limited to AC electric power and can also utilize direct current (DC) voltage.

Unless otherwise specified within the disclosure, the term "electrical connection" refers to connecting one transport to another transport using one or more electrical cables. The term "electrical cable" can be interchanged throughout this disclosure with the term "power cable" "power cable connection," "cable connection," or "electrical cable connection." The terms "electrical cable," "power cable" "power cable connection," "cable connection," and "electrical cable connection" refer to a single cable assembly that bundles together one or more wires (e.g., copper wires) that carry AC or DC electric current to provide electric power. In one or more embodiments, the single cable assembly also includes other wire types, such as fiber optic wires that perform other functions besides providing electric power. For example, the fiber optic wires carry light for the purposes of transferring communication signals.

As used herein, the term "air intake," may be interchanged and generally referred to as "inlet", "inlet plenum" and "intake plenum," throughout this disclosure. Additionally, the term "lube oil heat exchanger" can be interchanged and generally referenced as a "radiator" and "oil cooler" within this disclosure.

The disclosure includes various example embodiments of a cooling assembly for a fracturing pump transport. In one embodiment, the cooling assembly includes a prime mover cooling assembly that has one or more air intakes that draw ambient air to cool an electric motor (also referred to as a pump electric motor) that drives one or more pumps. To intake ambient air, the prime mover cooling assembly includes one or more blowers and electric motors (also referred to as blower electric motors) that drive the blowers. By positioning the blower electric motors and blowers directly above the pump electric motor, the blowers cause ambient air to flow through the air intakes and cool the pump electric motor. The cooling assembly then routes the air that cools down the pump electric motor to one or more exhaust ventilators that route and discharge the heated air at the top of the cooling assembly. In one or more embodiments, to prevent exhaust air from flowing into a lube oil cooling assembly, the exhaust ventilators are positioned adjacent to and/or on the sides of the lube oil cooling assembly. The lube oil cooling assembly is also positioned directly on top of the pump electric motor. The lube oil cooling assembly contains one or more lube oil heat exchangers that cool lube oil circulating through or more pumps. Each lube oil heat exchanger includes a coil, inlet and outlet headers, a blower (e.g., a fan), an electric motor, and a control drive (e.g., variable frequency drive (VFD)) to control and regulate the electric motor. With the blowers, the lube oil heat exchangers propel ambient air onto the outer surface of the coil to cool lube oil flowing through the coil.

FIG. 1 is a schematic diagram of an embodiment of a fracturing fleet 103 located at well site 100. As shown in FIG. 1, the power source of electricity 102 provides power by connecting to the switch gear transport 108 using one or more medium voltage (e.g., 13.8 kV) cable connections. In one or more embodiments, the power source of electricity 102 includes one or more turbine-electric generator transports that compress and mix combustion air with hydrocarbon fuel to spin and generate mechanical energy and then converts the mechanical energy to electricity. The power source of electricity 102 can also include an inlet and exhaust transport that provides ventilation and combustion air to the turbine electric generator transport when generating electricity. Configuring and utilizing a turbine electric generator transport and an inlet and exhaust transport are discussed and shown in more detail in U.S. Pat. No. 9,534,473, filed Dec. 16, 2015 by Jeffrey G. Morris et al. and entitled "Mobile Electric Power Generation for Hydration Fracturing of Subsurface Geological Formations," which is hereby incorporated by reference as if reproduced in its entirety. In other embodiments, the power source of electricity 102 can include other transport configurations and/or power distribution arrangements to employ a centralized source of electricity that powers fracturing equipment.

FIG. 1 illustrates that switch gear transport 108 also connects to an auxiliary power transport 120. The auxiliary power transport 120 provides ancillary power for situations where the power source of electricity 102 is out of service or where peak electric power demand exceeds the electric power output of the power source of electricity 102. The switch gear transport 108 also includes a transformer 112 that steps down electric power received at a medium voltage level (e.g., 13.8 kV) from the auxiliary power transport 120 and/or power source of electricity 102 to a low voltage level (e.g., 480 V, 240 V and 110 V). In one or more embodiments, the low voltage level (e.g., 480 V) connection may provide electric power to ignite or start the power source of electricity 102 and/or provide power to other fracturing equipment. In one or more embodiments, the switch gear transport 108 may house a black start generator to initiate and start the power source of electricity 102. Using FIG. 1 as an example, the black start generator may provide electric power at 480 V. When the black start generator generates electric power, the switch gear transport 108 supplies the electric power directly to the power source of electricity 102 using the low voltage level connection. In other examples, the black start generator provides electric power at voltage levels that exceed 480 V (e.g., 600 V, 2.1 kV, and 4.2 kV). In these situations, the switch gear transport 108 can include other transformers to step down voltage from the black start generator to a voltage level to start the power source of electricity 102.

As shown in FIG. 1, the switch gear transport 108 outputs and supplies medium voltage (e.g., 13.8 kV) cable connections directly to the hydration-blender transport 106 and the fracturing pump transport 200 without connecting to any intermediate transports. FIG. 1 depicts that the switch gear transport 108 generates cable connections to directly connect to each fracturing pump transport 200. The switch gear transport 108 also directly connects to the hydration-blender transport 106 using a single medium voltage (e.g., 13.8 kV) cable connection. Additional transports can be connected to the switch gear transport 108 with a single medium voltage (e.g., 13.8 kV) cable connection, for example, up to a total of 24 for a single switch gear transport 108.

FIG. 1 illustrates that the hydration-blender transport 106 includes a transformer 112 that steps down the voltage levels to 480 V, 240 V and 110 V. The hydration-blender transport 106 can use the stepped down voltages levels to provide electric power to the electric prime movers, drives, and/or other control instrumentation mounted on the hydration-blender transport 106. The hydration-blender transport 106 may also be configured to provide electric power at the 480 V, 240 V and 110 V voltage levels to other downstream fracturing equipment, such as the sand conveyor. The medium voltage power distribution system may utilize one or more electrical connections to provide electric power to the sand conveyor, data van 114 and/or other fracturing equipment that utilize electric power. Although FIG. 1 illustrates that switch gear transport 108 provides electric power to a hydration-blender transport 106, other embodiments can have the switch gear transport 108 separately connect to a hydration transport and a blender transport. In such an embodiment, the switch gear transport 108 may connect to the hydration transport using a single medium voltage (e.g., 13.8 kV) cable connection and another single medium voltage (e.g., 13.8 kV) cable connection to connect to the blender transport.

Each fracturing pump transport 200 includes one or more transformers to step down the voltage received from the switch gear transport 108 to different voltage levels. Using FIG. 1 as an example, each fracturing pump transport 200 may include two separate and independent transformers, a first transformer 110 to step down to a voltage level of 4.2 kV, 2.1 kV, or 1.2 kV and a second transformer 112 to step down to a voltage level of 480 V, 240 V and 110 V. In other examples, each fracturing pump transport 200 includes a single transformer that produces multiple voltages levels. For example, the fracturing pump transport 200 may mount a three-phase or three-winding transformer to step down the voltage to two different voltage levels. The 4.2 kV, 2.1 kV or 1.2 kV voltage level supplies electric power to one or more prime movers that drive one or more pumps, and the 480 V, 240 V and 110 V voltage level supplies electric power to the drives and/or other control instrumentation mounted on the fracturing pump transport 200. Other examples can have one or more transformers that step down the voltage received from the switch gear transport 108 to other voltages levels (e.g., below 1.2 kV, between 2.1 kV and 1.2 kV, or between 4.2 kV and 2.1 kV). Transformers 110 and 112 supply enough electric current to power the prime movers, drivers, and/or other control instrumentation.

In one or more embodiments, each fracturing pump transport 200 includes a prime mover cooling assembly 300 that cools a prime mover (also referred to as pump prime mover) that drives one or more pumps. As disclosed in more detail below with reference to FIGS. 2-5, the prime mover cooling assembly 300 includes one or more air intakes that draw in ambient air and cools the pump prime mover. The prime mover cooling assembly 300 includes one or more prime movers (also referred to as blower prime movers) that drive one or more blowers to draw in ambient air. The blower prime movers and blowers are positioned directly on top of or above the pump prime mover, and the air intakes are positioned to the side of the pump prime mover to improve the flow of ambient air. When the air flows through the pump prime mover, the air cools down the different components of the pump prime mover, such as the stator and rotor. Having the blower prime movers and blowers positioned directly above the pump prime mover with the air intakes positioned to the side of the pump prime mover creates an air flow that improves heat transfer efficiency; thereby, lowering the operating temperature of the pump prime mover.

The prime mover cooling assembly 300 then directs the heated air to exhaust ventilators, which discharges the heated air at the top side of the prime mover cooling assembly 300 and/or lube oil cooling assembly. In one or more embodiments, the exhaust ventilators are positioned at opposite sides of each other and/or along the same sides as the mounting of the air intakes. The exhaust ventilators prevent exhaust air from flowing into a lube oil cooling assembly also located directly above the pump prime mover. The lube oil cooling assembly houses one or more lube oil heat exchangers to cool lube oil circulating through one or more pumps. The lube oil removes heat generated from pumps during operation.

Figure 2:
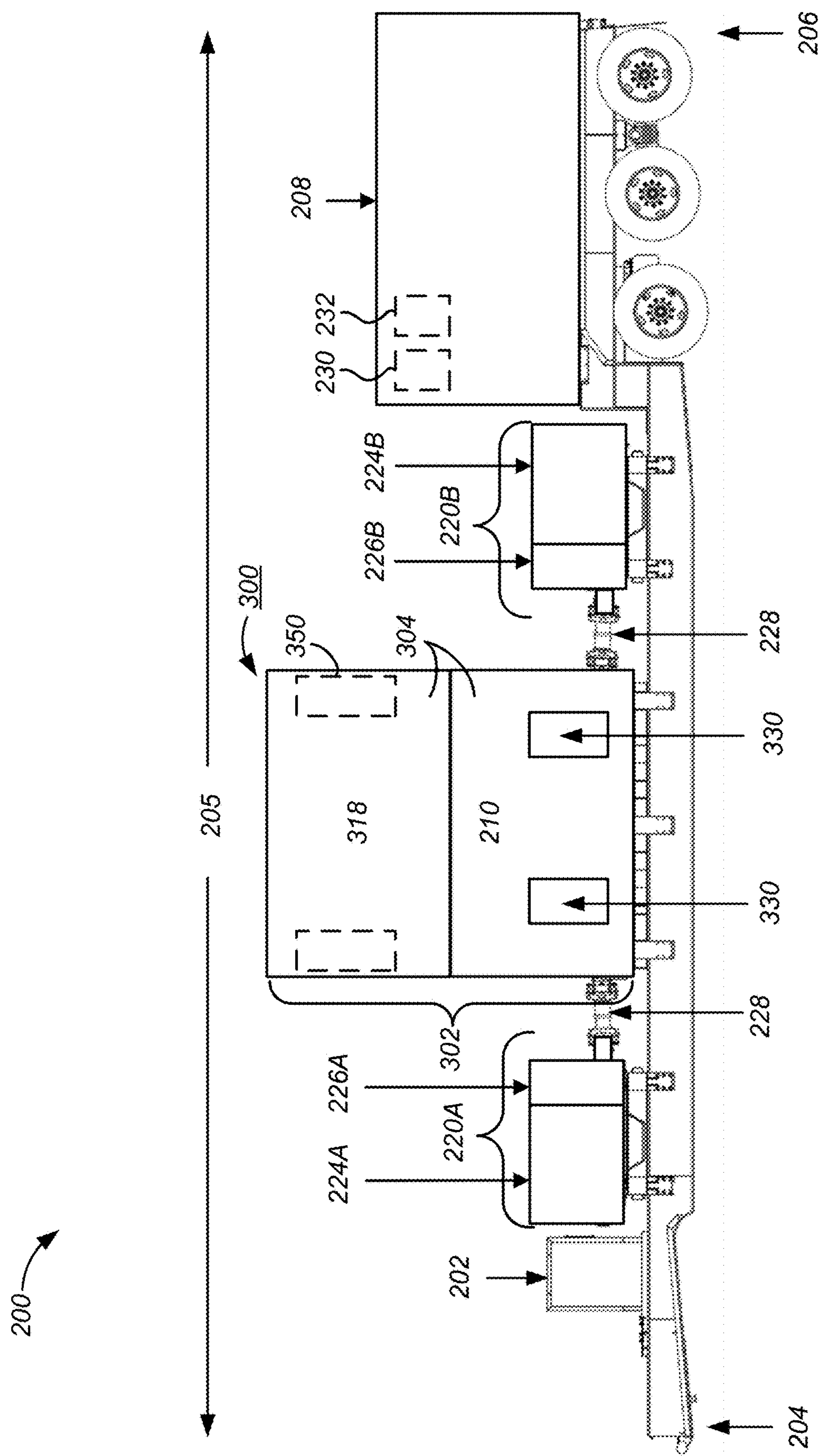
FIG. 2 illustrates a side profile view a fracturing pump transport that includes a cooling assembly for a pump prime mover and lube oil that circulates through one or more pumps.

In particular and as shown in FIG. 2, the fracturing pump transport 200 may include a lube oil pump 230 that pumps lube oil from a lube oil reservoir 232 into the pumps 220A-B. After flowing through the pumps 220A-B, the lube oil enters the lube oil heat exchangers of the lube oil cooling assembly 350 via inlet headers, flows through a coil within the lube oil heat exchangers, and discharges out of outlet headers. Blowers propel ambient air onto the outer surface of the coil to cool the lube oil and transfer heat to the blown air. The lube oil then flows out of the lube oil heat exchangers and back to the pumps 220A-B. Heated air from cooling the lube oil then vents out through the top of the lube oil cooling assembly 350.

Although FIG. 1 illustrates a specific embodiment of a fracturing fleet 103 that utilizes electric power for operations, the disclosure is not limited to this embodiment shown in FIG. 1. For instance, with reference to FIG. 1, the disclosure describes a switch gear transport 108 receiving electric power from a centralized power source of electricity 102 located at the well site 100. However, other embodiments can have the transports receive electric power from other types of power sources, such as a power grid or from distributed sources of electricity. The fracturing fleet 103 can also utilize other voltages and/or currents than shown in FIG. 1. Additionally or alternatively, the fracturing fleet 103 shown in FIG. 1 can be altered to utilize a separate hydration transport and blender transport instead of the combined hydration-blender transport 106. Fracturing fleet 103 can include other types of transports not explicitly shown in FIG. 1 or a different number of transports. The use and discussion of FIG. 1 is only an example to facilitate ease of description and explanation.

Having an understanding of the fracturing fleet 103 and the like, the disclosure now turns to further details of the fracturing pump transport 200 and the cooling assembly 300, as discussed in more detail in FIGS. 2-5. In general, the cooling assembly 300 includes a prime mover cooling assembly 302 and a lube oil cooling assembly 350.

FIG. 2 is a schematic diagram of an embodiment of a fracturing pump transport 200 with a cooling assembly 300 to cool the pump prime mover 210 and to cool the lube oil for the pumps 220A and 220B. FIG. 2 illustrates a side profile view of the fracturing pump transport 200 of a transport side 205. In FIG. 2, end side 204 represents a front-end side of the fracturing pump transport 200 and end side 206 represents a back-end side of the fracturing pump transport 200. As shown in FIG. 2, the end side 206 is closer to the location of the trailer axles, and end side 204 is closer to the trailer hitch for connecting the fracturing pump transport 200 to a transportation vehicle. Typically, transport side 205 is longer than the two end sides 204 and 206.

In FIG. 2, the fracturing pump transport 200 includes an engagement panel 202 that adjusts an engagement coupling (not shown) to engage and disengage pumps 220A and 220B from pump prime mover 210. As an example, the engagement panel 202 includes levers or switches that an operator manually operates to engage or disengage the pump prime mover 210 to pumps 220A and 220B. Additionally or alternatively, to engage and disengage the pumps 220A and 220B from the pump prime mover 210, the engagement panel 202 may include electronic controllers that receive instructions from remote locations, such as a monitoring station that is part of a power and control system 208, another location at the well site (e.g., data van), and/or off-site. For example, if both pumps 220A and 220B are initially in an engaged position, in response to receiving a remote command, the engagement panel 202 may trigger the disengagement of pump 220B, while pump 220A remains in the engaged position.

In one or more embodiments, to engage and disengage within a limited space, an engagement coupling (not shown) is affixed to a motor shaft end for the pump prime mover 210. The engagement coupling can be a plate clutch coupling that engages and disengages with a drive shaft 228 that connects to a pump shaft (e.g., pinion shaft or external gear box shaft). The plate clutch coupling can be connected to or be part of the motor shaft that generates torque that rotates the drive shaft 228. To connect or disconnect the pumps 220A and 220B from the pump prime mover 210, the plate clutch coupling may move back and forth to engage or disengage the drive shaft.

The plate clutch coupling may include multiple friction plates to increase the friction used to engage the end of the motor shaft to the drive shaft 228. Other embodiments of the engagement couplings that may be used to engage and disengage the pump prime mover 210 with pumps 220A and 220B include air clutches, electro-magnetic clutches, hydraulic clutches, splined tooth clutches, and/or other clutches and disconnects that have manual and/or remote operated disconnect devices.

FIG. 2 also illustrates that the fracturing pump transport 200 utilizes a laydown trailer to enhance mobility, improve safety, and enhance ergonomics for crew members when performing routine maintenance and operations of the pumps 220A and 220B. The laydown trailer positions the pumps lower to the ground as the main trailer beams are resting on the ground in operational mode. With the laydown trailer design, the fracturing pump transport 200 has an upper section above the trailer axles that can hold or have mounted the power and control systems 208.

The power and control system 208 may include one or more control drives (e.g., VFDs), transformers, and controls (e.g., a programmable logic controller (PLC) located on the fracturing pump transport 200). The control drives may provide control, monitoring, and reliability functionality, such as preventing damage to a grounded or shorted pump prime mover 210 and/or preventing overheating of components (e.g., semiconductor chips) within the electric drives. The transformers within the power and control systems 208 can step one or more input voltages (e.g., 13.8 kV) to one or more lower voltages (e.g., 4.2 kV, 2.1 kV, 1.2 kV, 600 V and 480V).

In one embodiment, the pump prime mover 210 is a dual shaft electric motor that has a motor shaft with two different ends that extend on opposite sides of the electric motor. Pump prime mover 210 may include more than one electric motor and more than two motor shafts. In the embodiment shown in FIG. 2, One end extends out of the dual shaft electric motor toward the direction of pump 220A, and the other end extends out of the dual shaft electric motor toward the direction of pump 220B. As shown in FIG. 2, because the ends are on opposite sides of the dual shaft electric motor, the pumps 220A and 220B are mounted on opposites sides of the dual shaft electric motor 210. The dual shaft electric motor 210 may be any desired type of alternating current (AC) or direct current (DC) motor. For example, the dual shaft electric motor 210 may be an induction motor. In another example the dual shaft electric motor 210 may be a permanent magnet motor.

Other embodiments of the pump prime mover 210 include other electric motors that are configured to provide about 5,000 HP or more. For example, the dual shaft electric motor 210 may deliver motor power in a range from about 1,000 HP to about 10,000 HP. Specific to some embodiments, the dual shaft electric motor 210 is a 5,000 HP rated electric motor, a 6,000 HP rated electric motor, a 7,000 HP rate electric motor, or a 10,000 HP electric motor. As an example, at least one control drive (e.g., VFD) drives a pump prime mover 210 that is rated to a range of about 1,000 HP to about 10,000 HP, and may receive electric power generated from the mobile source of electric power.

The fracturing pump transport 200 may reduce the footprint of fracturing equipment on a well-site by placing two pumps 220A and 220B on a single transport. Larger pumps may be coupled to the pump prime mover 210 that operates with larger horse power to produce additional equipment footprint reductions. In one embodiment, each pump 220A and 220B may be quintiplex pumps located on a single transport. Other embodiments may include other types of plunger style pumps, such as duplex or triplex pumps. The pumps 220A and 220B may each operate from a range of about 1,000 HP to about 10,000 HP. Specifically, in one or more embodiments, each of the pumps 220A and 220B may operate at HP ratings of about 1,000 HP, 1,200 HP, 1,500 HP, 1,750 HP, 2,000 HP, 2,250 HP, 2,500 HP, 2,600 HP, 2,700 HP, 3,000 HP, 3,500 HP, 4,000 HP, 4,500 HP, and/or 5,000 HP.

In one or more embodiments, the pump prime mover 210 and each of the pumps 220A and 220B are mounted on sub-assemblies for isolating and allowing for individual removal from the fracturing pump transport 200. In other words, the pump prime mover 210 and each of the pumps 220A and 220B can be removed from service and replaced without shutting down or compromising other portions of the fracturing system. If the pump prime mover 210 needs to be replaced or removed for repair, operators can detach the prime mover sub-assembly from the fracturing pump transport 200 without removing the two pumps 220A and 220B from the fracturing pump transport. For example, pump 220A can be isolated from the fracturing pump transport 200, removed and replaced by a new pump 220A. If the pump prime mover 210 and/or the pumps 220A and 220B require service, an operator can isolate the different components from the fluid lines, and unplug, un-pin, and remove the pump prime mover 210 and/or the pumps 220A and 220B from the fracturing pump transport. Furthermore, each pump 220A and 220B sub-assembly may be detached and removed from the fracturing pump transport 200 without removal of the other pump and/or the pump prime mover 210.

In FIG. 2, pumps 220A and 220B are well service pumps that each include external gear boxes 226A, 226B that houses one or more pinion gears and bull gears. The external gear boxes 226A and 226B are in a separate and/or distinct enclosure than the power end assemblies 224A and 2244B. In prior well service pumps, such as plunger-style pumps, the pinion gears and bull gears would be part of or embedded within the power end assemblies 224A and 224B. In other words, prior well service pumps would house the pinion gears and bull gears within the power end assemblies 224A and 224B. However, to improve pump performance and/or efficiency, the pinion gears and bull gears are separated out from the power end assemblies 224A and 224B and moved to external gear boxes 226A and 226B. Because of the additional space the external gear boxes 226A and 226B potentially occupy, the reduced distance between the pump prime mover 210 and pumps 220A and 220B may cause space issues that prevent and/or complicate the utilization of certain engagement coupling to engage and disengage pumps 220A and 220B from the pump prime mover 210. Although FIG. 2 shows pumps 220A and 220B are external gear box-style pumps, this may not necessarily be the case. Pumps 220A and 220B may be of any suitable type (e.g., plunger-style pumps).

As noted above, the cooling assembly 300 includes the prime mover cooling assembly 302 that encases or attaches to the pump prime mover 210. The prime mover cooling assembly 302 can completely encase or partially encase the pump prime mover 210. In general, the prime mover cooling assembly 302 can include one or more housings 304, such as enclosures, hoods, covers, panels, vents, and the like, that are mounted on, around, and/or on top of the prime mover 210.

Figure 3:
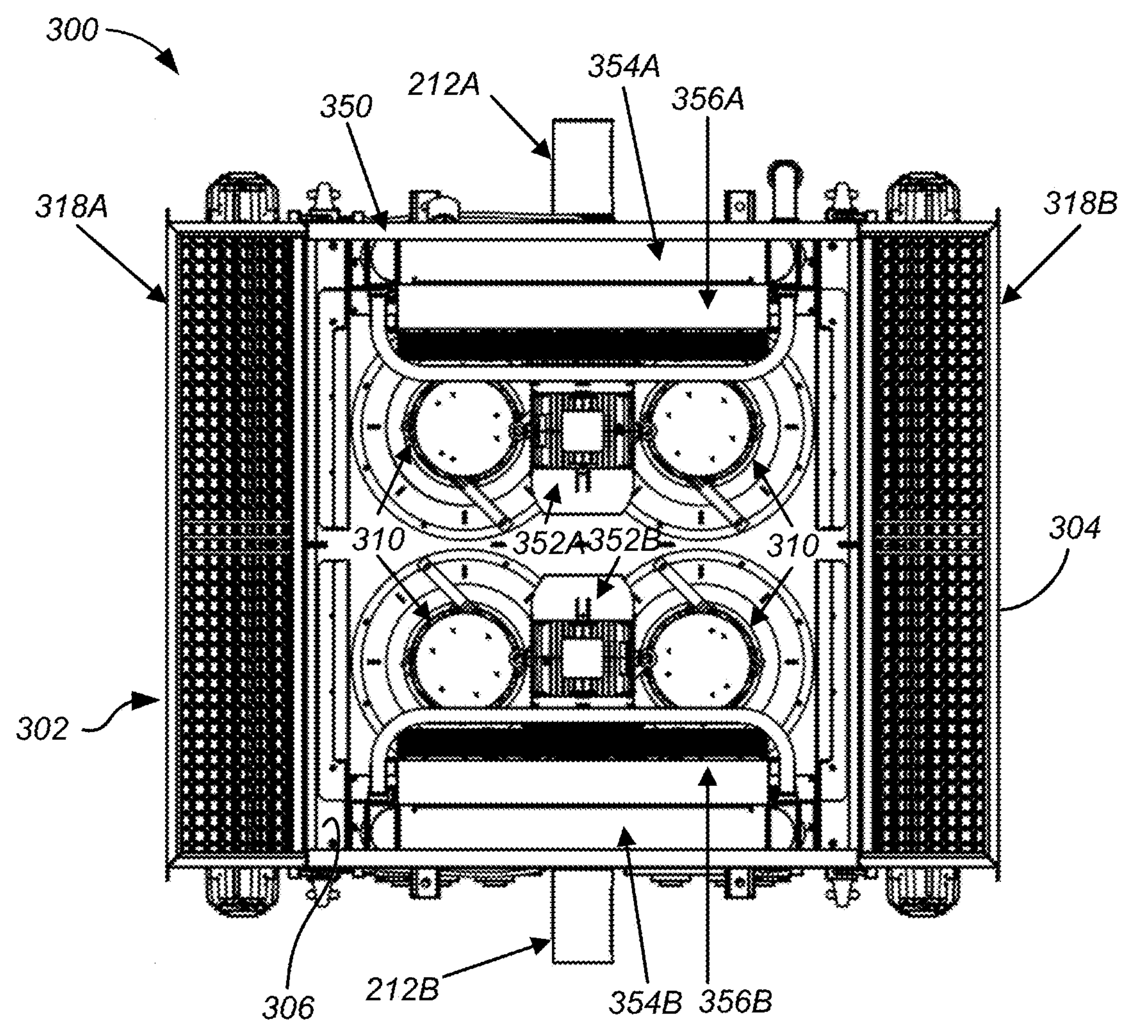
FIG. 3 illustrates a top-down view of an embodiment of a cooling assembly for the fracturing pump transport.

For example, FIG. 2 illustrates that the prime mover cooling assembly 302 includes multiple air intakes 330 mounted to the sides of the pump prime mover 210. Specifically, the air intakes 330 are not mounted on the top or bottom sides of the pump prime mover 210 and are positioned below exhaust ventilators 318, the blower prime movers (310; FIG. 3), and/or the lube oil cooling assembly 350. The air intakes 330 draw in ambient air to cool the pump prime mover 210.

Although not shown in FIG. 2, the prime mover cooling assembly 302 contains blower prime movers (310; FIG. 3) connected to blowers positioned directly on top of the pump prime mover 210 to improve the flow of ambient air. When the air flows into the air intakes 330 and through the pump prime mover 210, the pump prime mover 210 transfers generated heat to the circulating air. The prime mover cooling assembly 302 then directs the heated air to exhaust ventilators 318, which discharge the heated air at the top side of the cooling assembly 300.

As noted above, the cooling assembly 300 also includes the lube oil cooling assembly 350 that is mounted on top of the pump prime mover 210. With reference to FIG. 2, the lube oil cooling assembly 350 is located behind the exhaust ventilator 318 and houses one or more lube oil heat exchangers (not shown) to cool lube oil circulating through pumps 220A and 220B. Again, the fracturing pump transport 200 can include one or more lube oil pumps 230 that pump lube oil from a lube oil reservoir 232 into the pumps 220A and 220B. After flowing through pumps 220A and 220B, the lube oil enters the lube oil cooling assembly 350 and flows through the one or more lube oil heat exchangers (not shown). As will be appreciated, tubing and other piping components are used to interconnect the lube oil pump 230, the lube oil reservoir 232, the pumps 220A-B, and the lube oil cooling assembly 350, and they may not be shown. Location of the lube oil pump 230, reservoir 232, and the like is only schematically represented in FIG. 2.

In one or more embodiments, each lube oil heat exchanger (not shown) cools lube oil from one of the pumps 220A and 220B. For example, the lube oil cooling assembly 350 includes one lube oil heat exchanger (not shown) that cools lube oil circulating through pump 220A and includes a separate lube oil heat exchanger (not shown) that cools lube oil circulating through pump 220B. In other embodiments, lube oil cooling assembly 350 can include one or more lube oil heat exchangers (not shown) that cool lube oil circulating from multiple pumps 220A-B. Blowers (not shown) connected to the assembly's blower prime movers (310; FIG. 3) propel ambient air to cool the lube oil and transfer heat to the air. The lube oil then flows out of the lube oil heat exchangers (not shown) and back to the pumps 220A, 220B. Heated air from cooling the lube oil then vents out through the top of the cooling assembly 300.

Although FIG. 2 illustrates a specific embodiment of a fracturing pump transport 200 that includes cooling assembly 300, the disclosure is not limited to the specific fracturing pump transport 200 shown in FIG. 2. For example, even though FIG. 2 illustrates that the pump prime mover 210 is a dual shaft electric motor, other embodiments of the fracturing pump transport 200 may use other types of prime movers. As an example, the pump prime mover 210 can be an electric prime mover or a hydrocarbon fuel-based prime mover. In another example, the pump prime mover 210 can be a single shaft motor that drives a single pump with a motor shaft that has a single end extending out of the pump prime mover 210. Additionally, embodiments within the disclosure are not limited to pumps 220A and 220B with external gear boxes 226A and 226B. Instead, pumps 220A and 220B can be well service pumps that have the pinion gears and bull gears embedded within the power end assemblies 224A and 224B.

FIG. 3 illustrates a top-down view of an embodiment of a cooling assembly 300 for a fracturing pump transport (e.g., 200; FIG. 2). The top-down view of the cooling assembly 300 depicts the top of the exhaust ventilators 318A and 318B, which are part of the prime mover cooling assembly 302 at least partially encasing the pump prime mover (210). In FIG. 3, the exhaust ventilators 318A and 318B are located on opposite sides of the cooling assembly 300. The exhaust ventilators 318A and 318B route heated air used to cool the pump prime mover (210) out the top side of the cooling assembly 300. By doing so, heated air exiting the exhaust ventilators 318A and 318B does not flow into the lube oil cooling assembly 350.

Figure 4:
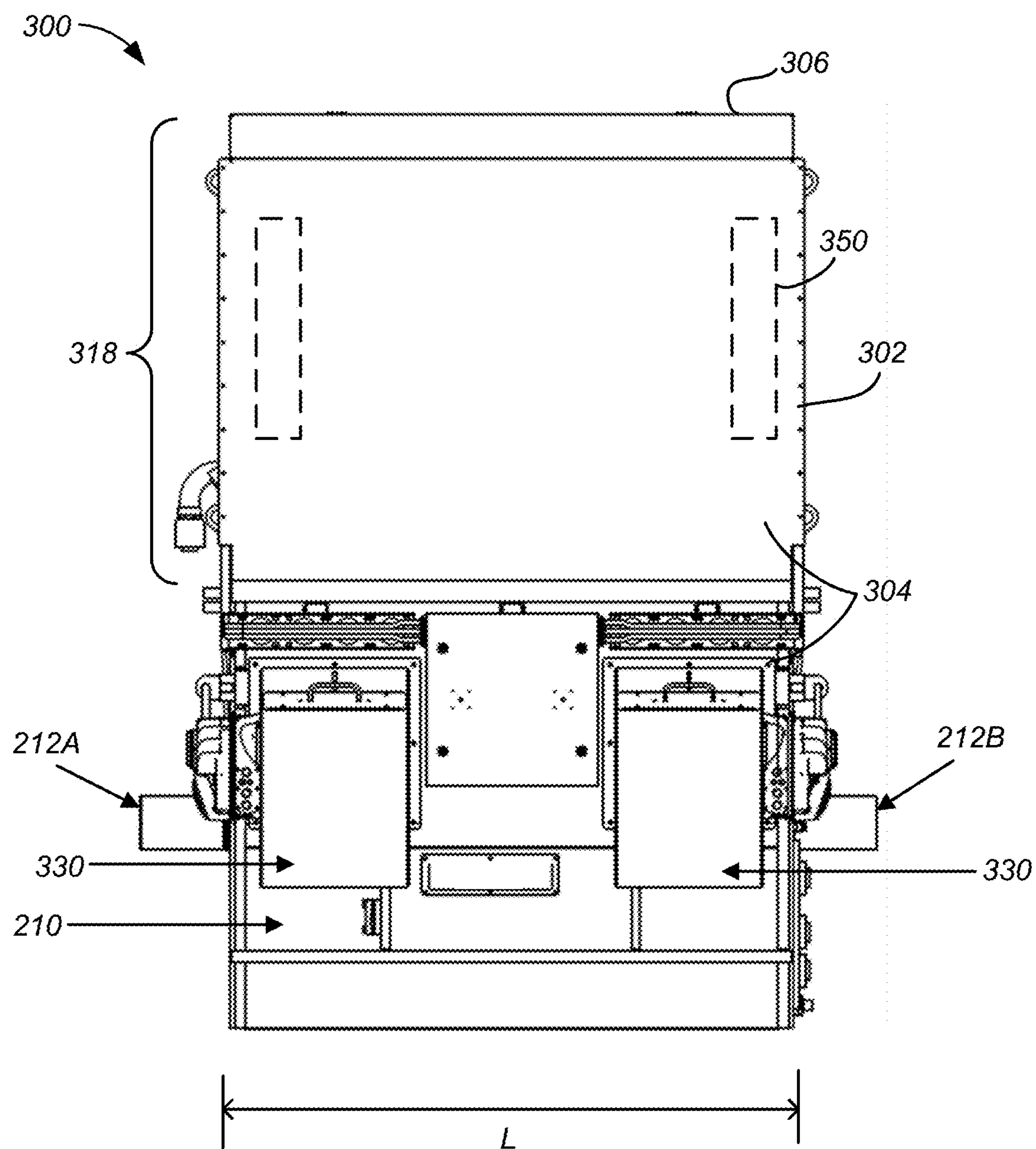
FIG. 4 illustrates a side profile view of the cooling assembly for the fracturing pump transport.

Additionally, the top view of FIG. 3 illustrates that the lube oil cooling assembly 350 is located between the two exhaust ventilators 318A and 318B. The lube oil cooling assembly 350 is mounted on top of the pump prime mover (210) and does not hang off the top sides of the pump prime mover (210), the prime mover cooling assembly 302 (e.g., air intakes 330; FIG. 4), and/or other sections of the cooling assembly 300. In other words, the lube oil cooling assembly 350 does not extend beyond the plan dimensions (e.g., length, width, or depth) of the housings 304 of the prime mover cooling assembly 302, which itself does not significantly exceed the plan dimensions (i.e., the length and width) of the prime mover (210). Positioning the lube oil cooling assembly 350 on top of the pump prime mover (210) and/or prime mover cooling assembly 302 provides additional clearance for operators to perform maintenance work and/or troubleshoot failures for the pump prime mover (210) and/or other components of the fracturing pump transport (200). Height is less of a concern.

As shown in FIG. 3, the cooling assembly 300 includes multiple blower prime movers 310, 352A-B that drive multiple blowers. Each of these blower prime movers 310, 352A-B are disposed in an area above or atop the prime mover (210). The housing 304, the ventilator exhausts 318, and the lube oil cooling assemblies 350 are all arranged atop the prime mover (210) to form a central exhaust 306, which is best seen in the top view of FIG. 3. This central exhaust 306 provides an exhaust out the top of the cooling assembly 300 for air heated by the lube oil cooling assemblies 350, which draw in air from outside the ends of the cooling assembly 300. Additionally, this central exhaust 306 allows for any heat generated by the blower prime movers 310, 352A-B to exhaust out the top of the cooling assembly 300 without interfering with other processes. Indeed, operation of the blowers 356A-B for the lube oil cooling assemblies 350 may help ventilate heat out the central exhaust 306. Mingling of exhaust from the central exhaust 306 with the exhaust from the ventilator exhausts 318 may be done, but the exhaust from the prime mover (210) out the ventilator exhausts 318 is preferably handled separately as shown here due in part to its higher temperature.

Figure 5:
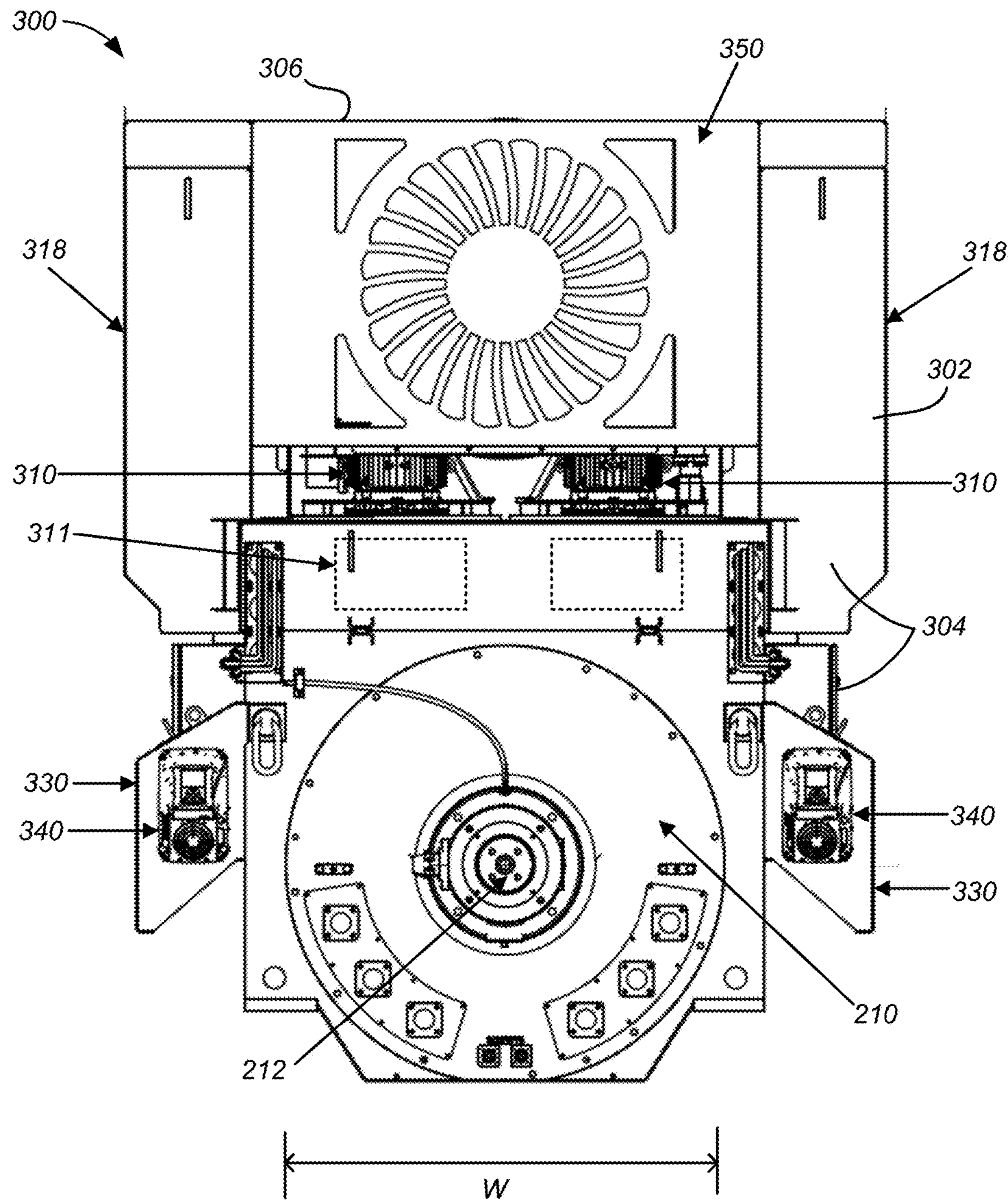
FIG. 5 illustrates an end side view of the cooling assembly for the fracturing pump transport.

As shown in FIGS. 3-5, the prime mover cooling assembly 302 includes multiple blower prime movers 310 that drive multiple blowers (311; FIG. 5). The multiple blowers (311) are orientated in a downward direction, facing the pump prime mover (210). In one or more embodiments, the downward direction aligns with the direction of the heated air that vents through the top of the cooling assembly 300 (e.g., exhaust ventilators 318A and 318B). Positioning the blowers 311 in a downward direction and directly above the pump prime mover (210) improves the intake of ambient air. Specifically, having the blower prime movers 310 and blowers 311 positioned directly above the pump prime mover (210) creates an air flow path that improves heat transfer efficiency and lowers the operating temperature of the pump prime mover (210). The cooling assembly 300 then directs the heated air to exhaust ventilators 318A and 318B to discharge the heated air.

The top view of FIG. 3 depicts the lube oil cooling assembly 350 with two lube oil heat exchangers. One lube oil heat exchanger includes coil 354A, blower 356A, and lube oil-prime mover 352A, and the other lube oil heat exchanger includes coil 354B, blower 356B, and lube oil-prime mover 352B. In one or more embodiments, lube oil for the pump (220A) that connects to motor shaft end 212A circulates through coil 354A, and lube oil for the other pump (220B) that connects to motor shaft end 212B circulates through coil 354B. Other embodiments can circulate the lube oil from the pump (220B) that connects to motor shaft end 212B through coil 354A and can circulate the lube oil from the pump (220A) that connects to motor shaft end 212A through coil 354B.

Lube oil-prime movers 352A and 352B drive blowers 356A, 356B to draw in ambient air from sides of lube oil cooling assembly 350. In the top view of FIG. 3, the sides that draw in ambient air face the same direction as the motor shaft ends 212A and 212B. Blowers 356A, 356B propel ambient air onto the outer surface of the coils 354A, 354B to cool lube oil flowing through the coils 354A, 354B. The lube oil and coils 354A, 354B transfer heat to the air, which then discharges out the top of the of the lube oil cooling assembly 350. The cooled lube oil then flows out of the lube oil heat exchangers via outlet headers (not shown) and back to the pumps (220A-B).

FIG. 4 illustrates a side profile view of the cooling assembly 300 for a fracturing pump transport (200; FIG. 2). The side-profile of the cooling assembly 300 view corresponds to the side profile view shown in FIG. 2. Multiple air intakes 330 are mounted to the side and/or are part of the housing(s) 304 of the prime mover cooling assembly 302 that completely or partially encases the pump prime mover 210. In the side view of FIG. 4, two distinct air intakes 330 are mounted on one side of the pump prime mover 210, while the exhaust ventilator 318 is positioned above both the pump prime mover 210 and the air intakes 330. The air intakes 330 are not situated above the pump prime mover 210 because the blower prime movers (310; FIG. 3), blowers, and lube oil cooling assembly (350; FIG. 3) are located above. As previously discussed, ambient air enters the air intakes 330, which then flows through and around the pump prime mover 210 to dissipate heat generated from the pump prime mover 210. The heated air then flows out of the exhaust ventilator 318 to avoid having the heated air enter the lube oil cooling assembly (350).

In FIG. 4, the lube oil cooling assembly (350) is located behind the exhaust ventilators 318. The lube oil cooling assembly (350) does not extend over and/or cover the motor shaft ends 212A and 212B by hanging off the pump prime mover 210, the prime mover cooling assembly 302, and/or any other sections of the cooling assembly 300. Rather, the lube oil cooling assembly (350) and exhaust ventilators 318 are mounted flush with a plan dimension of (i.e., length L) the pump prime mover 210. Mounting the lube oil cooling assembly (350) on top of pump prime mover 210 and without extending from or attaching to the top sides of the pump prime mover 210 and/or other sections of the cooling assembly 300 provides additional clearance for operators. Specifically, preventing the lube oil cooling assembly (350) from extending beyond length L in either direction the motor end shafts 212A or 212B are facing removes obstructions that may hinder operators from performing maintenance work and/or troubleshoot failures.

FIG. 5 illustrates an end side view of the cooling assembly 300. The end side view corresponds to a view from either the front-end side or back-end side of the fracturing pump transport (200) shown in FIG. 2. As shown in the end view of FIG. 5, the prime mover 210 has another plan dimension (i.e., a width W). Two exhaust ventilators 318 are positioned above the air intakes 330 and the pump prime mover 210. The exhaust ventilators 318 and the air intakes 330 are mounted on the same side of the pump prime mover 210. The blower prime movers 310 are directly mounted above the pump prime mover 210 and are also positioned above the air intakes 330. The blowers 311 are attached underneath the blower prime movers 310 and face the pump prime mover 210. The blowers 311, only schematically shown in FIG. 5, are located within the housing 304 of cooling assembly 300. The lube oil cooling assembly 350 is also mounted directly above the pump prime mover 210 and in between the exhaust ventilators 318.

The end view of FIG. 5 illustrates that control drives 340 can be attached to the air intakes 330. In one or more embodiments, the control drives 340 are VFDs that control and regulate the prime movers (e.g., blower prime movers 310, 352) within the prime mover cooling assembly 302 and/or the lube oil cooling assembly 350. An operator may set desired or target operating temperatures for the pump prime mover 210 and lube oil. The control drives 340 then regulate and control the prime movers (e.g., 310) to achieve the desired or target operating temperature. As an example, control drives 340 can cause the blower prime movers 310/352A to drive the blowers 311/356A to rotate at a higher revolution per minute (RPM) to draw-in more ambient air into the prime mover cooling assembly 302 and/or lube oil cooling assembly 350. Rotating at a higher RPM may occur when the pump prime mover 210 and/or pumps (220) are under more load and generating more heat. Alternatively, the control drives 340 can cause the blower prime movers 310/352A to drive blowers 311/356A to rotate at a slower RPM to decrease noise when the pump prime mover 210 and/or pumps (220) are under less load and producing less heat.

Figure 6:
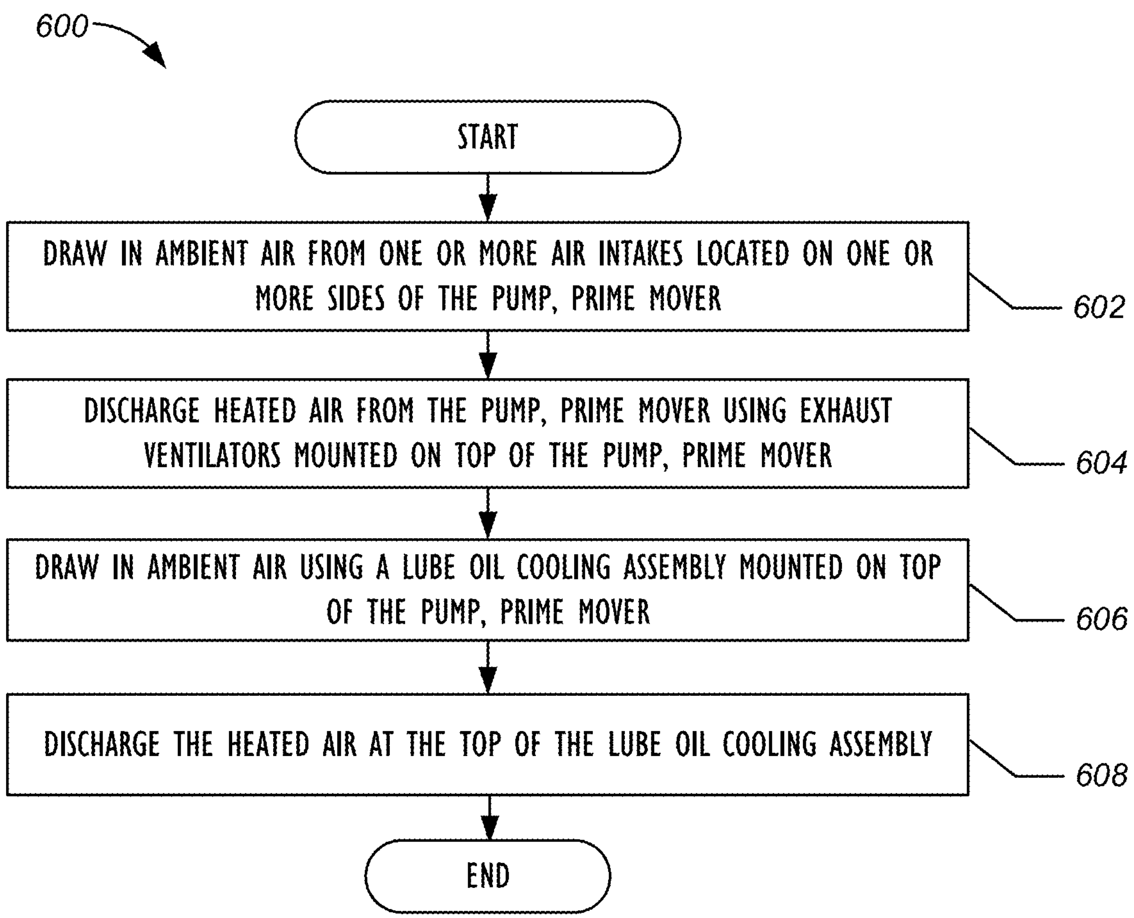
FIG. 6 is a flow chart of an embodiment of a method to cool a pump prime mover and lube oil for a fracturing pump transport.

FIG. 6 is a flow chart of an embodiment of a method 600 to cool a pump prime mover and lube oil circulating through pumps for a fracturing pump transport. Method 600 may be implemented using the cooling assembly 300, such as the prime mover cooling assembly and the lube oil cooling assembly. Additionally, although FIG. 6 illustrates that the blocks within method 600 are implemented in a sequential order, method 600 is not limited to this sequential order. For instance, one or more of the blocks, such as blocks 602 and 606, can be implemented in a parallel manner.

Method 600 may start at block 602 by drawing in ambient air from one or more air intakes located on one or more sides of the pump prime mover. To implement block 602, method 600 may utilize air intakes that are positioned below exhaust ventilators and the lube oil cooling assembly. Method 600 may draw in ambient air using one or more blowers connected and driven by one or more blower prime movers (e.g., blower electric motors). Method 600 may then move to block 604 and discharge heated air from the pump prime mover using exhaust ventilators mounted on top of the pump prime movers. The exhaust ventilators route the heated air above the cooling assembly and away from the lube oil cooling assembly. Method 600 then continues to block 606 and draws in ambient air using a lube oil cooling assembly mounted on top of the pump prime mover. Method 600 utilizes the ambient air to cool lube oil circulating through the coils. Afterwards, method 600 moves to block 608 and discharges the heated air at the top of the lube oil cooling assembly.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. A fracturing transport having at least one pump, the at least one pump having lube oil for circulating within the at least one pump, the transport comprising:

a prime mover configured to drive the at least one pump with a motor shaft, the prime mover having plan dimensions defined by a length and a width of the prime mover;

a first cooling assembly at least partially encasing the prime mover and comprising:

at least one intake disposed on the first cooling assembly and delivering ambient air to the prime mover; and at least one exhaust disposed on the first cooling assembly above the prime mover and exhausting the delivered air from the prime mover; and a second cooling assembly disposed above the prime mover and within the plan dimensions of the prime mover, the second cooling assembly cooling the lube oil circulating within the pump, wherein the second cooling assembly is within a housing of the first cooling assembly.

2. The transport of claim 1, wherein the at least one intake is disposed at a height below the at least one exhaust.

3. The transport of claim 1, wherein the at least one intake is disposed to at least one side of the prime mover, and wherein the at least one side of the prime mover is not a top side or a bottom side of the prime mover.

4. The transport of claim 1, wherein the at least one exhaust comprises first and second exhausts disposed on opposing sides of the prime mover, and wherein the second cooling assembly is disposed between the first and second exhausts.

5. The transport of claim 1, wherein the second cooling assembly is disposed flush with the plan dimensions of the prime mover.

6. The transport of claim 1, wherein the second cooling assembly comprises at least one lube oil heat exchanger driven by at least one electric mover.

7. The transport of claim 6, wherein the second cooling assembly comprises first and second of the at least one lube oil heat exchanger respectively driven by first and second of the at least one electric mover.

8. The transport of claim 1, wherein the first cooling assembly further comprises at least one electric mover disposed on top of the prime mover and within the plan dimensions of the prime mover, wherein the at least one electric mover drives a blower that draws in the ambient air through the at least one intake.

9. The transport of claim 1, wherein the prime mover comprises an electric motor or a hydrocarbon fuel-based motor.

10. A fracturing pump transport comprising:

at least one pump having lube oil for circulating therethrough;

a pump prime mover coupled to the at least one pump and configured to drive the at least one pump with a motor shaft, the pump prime mover having plan dimensions defined by a length and a width of the pump prime mover; and a cooling assembly at least partially encasing the pump prime mover and configured to cool the pump prime mover and the lube oil with ambient air, the cooling assembly comprising:

a housing disposed above the pump prime mover;

at least one intake configured to intake the ambient air to the pump prime mover;

at least one exhaust disposed above the pump prime mover and within the housing, the at least one exhaust configured to exhaust the ambient air from the pump prime mover; and at least one heat exchanger exposed to the ambient air and circulating the lube oil to and from the pump, the at least one heat exchanger being disposed above the pump prime mover within the housing, and within the plan dimensions of the pump prime mover.

11. The transport of claim 10, wherein the cooling assembly further comprises at least one blower mover connected to at least one blower, the at least one blower being disposed above the pump prime mover, within the plan dimensions of the pump prime mover, and configured to circulate the ambient air from the at least one intake over the pump prime mover and out the at least one exhaust.

12. The transport of claim 10, wherein the cooling assembly further comprises at least one blower mover connected to at least one blower, the at least one blower being disposed above the pump prime mover, within the plan dimensions of the pump prime mover, and configured to circulate the ambient air through the at least one heat exchanger and out a top of the cooling assembly.

13. The transport of claim 10, wherein the at least one exhaust comprises first and second exhausts disposed on opposing sides of the pump prime mover, and wherein the at least one heat exchanger is disposed between the first and second exhausts.

14. A fracturing pump transport comprising:

at least one pump having lube oil for circulating through the at least one pump;

an electric motor coupled to the at least one pump, the electric motor having plan dimensions defined by a length and a width of the electric motor; and a cooling assembly at least partially encasing the electric motor, wherein the cooling assembly is configured to:

draw in air from one or more intakes with one or more blowers positioned on top of the electric motor;

ventilate air heated from cooling the electric motor at a top side of the cooling assembly with one or more exhausts;

draw in air through one or more lube oil heat exchangers positioned on top of the electric motor; and ventilate, at the top side of the cooling assembly, air heated from cooling the lube oil that circulates through the pump, wherein the one or more blowers and the one or more heat exchangers positioned on top of the electric motor are within the plan dimensions of the electric motor.

15. The fracturing pump transport of claim 14, wherein the electric motor is completely encased by the cooling assembly.

16. The fracturing pump transport of claim 14, wherein the electric motor is a dual shaft electric motor that drives a plurality of the at least one pump.

17. The fracturing pump transport of claim 14, wherein the at least one pump is an external gear box pump or a plunger-style pump.

18. The fracturing pump transport of claim 14, wherein one of the intakes and one of the exhausts are positioned on a same side of the electric motor.

19. A method used with an electric motor driving a pump, the pump having lube oil for circulating therethrough, the method comprising:

drawing in air through one or more intakes using one or more first blowers of a cooling assembly positioned on top of the electric motor;

cooling the electric motor with the air drawn in through the one or more intakes;

ventilating the air heated by the cooling of the electric motor out one or more exhausts at a top side of the cooling assembly;

drawing air through a lube oil heat exchanger positioned on top of the electric motor;

cooling the lube oil for circulating through the pump with the air drawn through the lube oil heat exchanger; and ventilating the air heated by the cooling of the lube oil at the top side of the cooling assembly, wherein the electric motor has plan dimensions defined by a length and a width of the electric motor, and wherein the one or more first blowers and the lube oil heat exchanger positioned on top of the electric motor are within the plan dimensions of the electric motor.

20. The method of claim 19, wherein drawing the air through the lube oil heat exchanger positioned on top of the electric motor comprises using one or more second blowers of the cooling assembly positioned on top of the electric motor.

* * * * *